United States Patent [19]

Sinjen

[11] Patent Number: 5,584,216
[45] Date of Patent: Dec. 17, 1996

[54] TOOL WITH BREAKAGE SENSOR AND METHOD

[76] Inventor: Arthur H. Sinjen, 23382 Portage Way #2108, Novi, Mich. 48375

[21] Appl. No.: 365,850

[22] Filed: Dec. 29, 1994

[51] Int. Cl.$^6$ ................................. B26F 1/14; B26D 5/00
[52] U.S. Cl. ................................ 83/62.1; 83/686
[58] Field of Search .................... 83/62.1, 62, 13, 83/686; 73/104

[56] References Cited

U.S. PATENT DOCUMENTS

| | | |
|---|---|---|
| 1,771,418 | 7/1930 | Pope . |
| 1,904,951 | 4/1933 | Peterson . |
| 2,738,008 | 3/1956 | Heyman . |
| 3,124,026 | 3/1964 | Loeffel . |
| 3,585,886 | 6/1971 | McDonald et al. ............... 83/62.1 |
| 3,728,919 | 4/1973 | Scott . |
| 4,120,196 | 10/1978 | Hamilton et al. . |
| 4,420,253 | 12/1983 | Pryor . |
| 4,620,281 | 10/1986 | Thompson et al. . |
| 4,744,241 | 5/1988 | Mayer . |

FOREIGN PATENT DOCUMENTS

| | | |
|---|---|---|
| 666057 | 7/1963 | Canada . |
| 329753 | 3/1920 | Germany . |
| 403270854 | 12/1991 | Japan ............................... 73/104 |
| 800928 | 9/1956 | United Kingdom . |

OTHER PUBLICATIONS

Exhibit A is a copy of a product brochure entitled "Ball Lock–Punches, Matrixes, Pilots, Retainers," published by Dayton Progress Corporation of Dayton, Ohio, dated Feb. 1985, disclosing a variety of punches and other tools including ball locks and holders for same.

Primary Examiner—Kenneth E. Peterson
Assistant Examiner—Sean A. Pryor
Attorney, Agent, or Firm—Price, Heneveld, Cooper, DeWitt & Litton

[57] ABSTRACT

A die punch includes a shank configured to operably engage a tool holder on a die, and a tip extending from the shank, the tip being configured to punch a hole in sheet material. A conductor extends from the shank to the tip along a longitudinally extending passageway in the punch. The conductor is insulated from the shank but electrically connected to said tip at one end by a bridge so that an electrical circuit is defined from the conductor through the bridge and tip to the shank. A first electrical contact is connected to the trailing end of the conductor and insulated from the shank, and a second contact is secured to the shank, either on the side or the end of the shank. The punch holder includes a pair of corresponding contacts so that the punch is electrically connected to the press control circuitry when the punch is secured in the punch holder. The continuity of the electrical circuit is continuously monitored to determine if the tip of the punch has been broken. When the punch tip breaks, the press is immediately signaled and stopped before a significant number of defective parts are made. In one embodiment, a paint is located in the passageway of the punch so that it marks a part as being defective if the punch tip breaks.

26 Claims, 2 Drawing Sheets

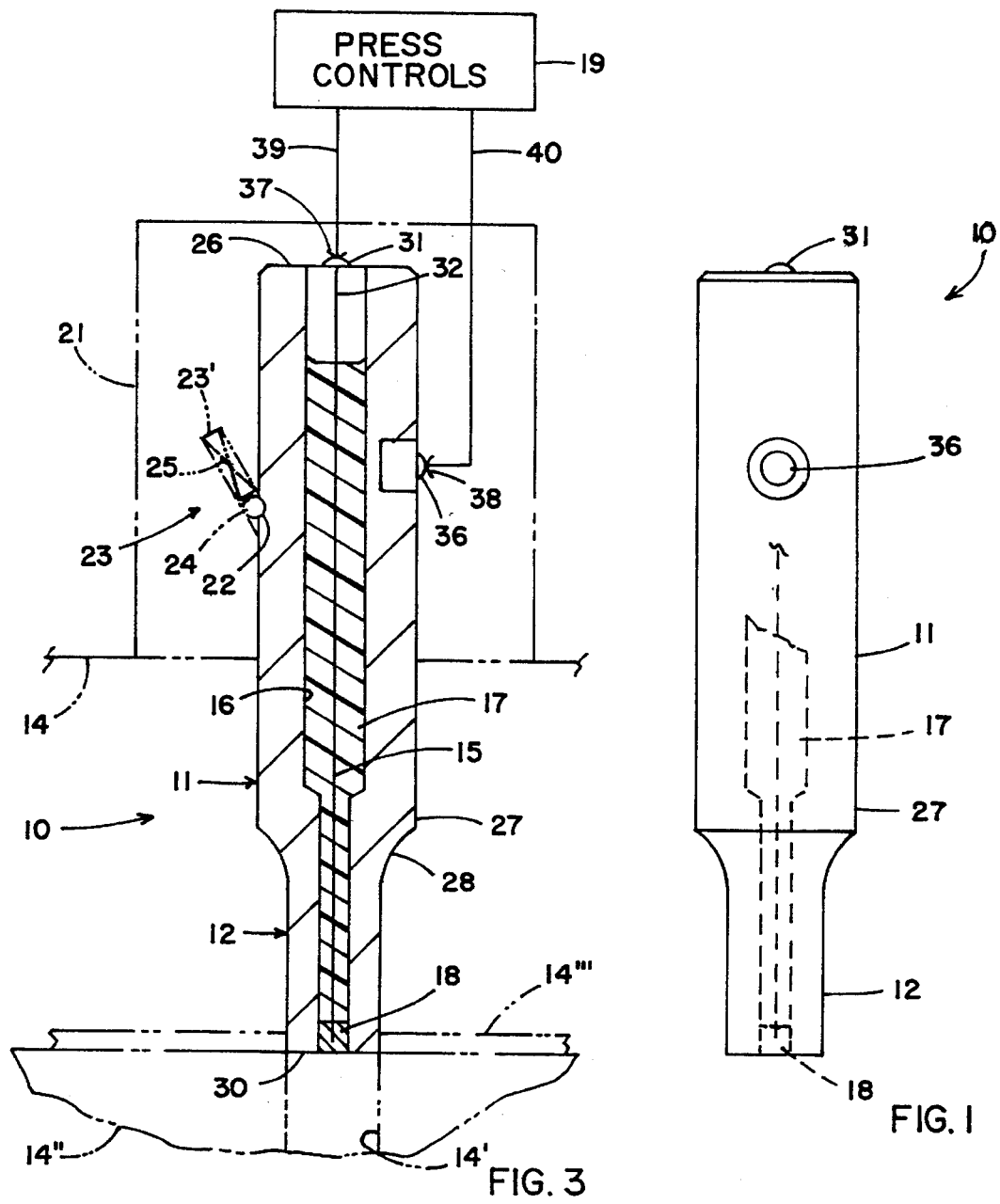
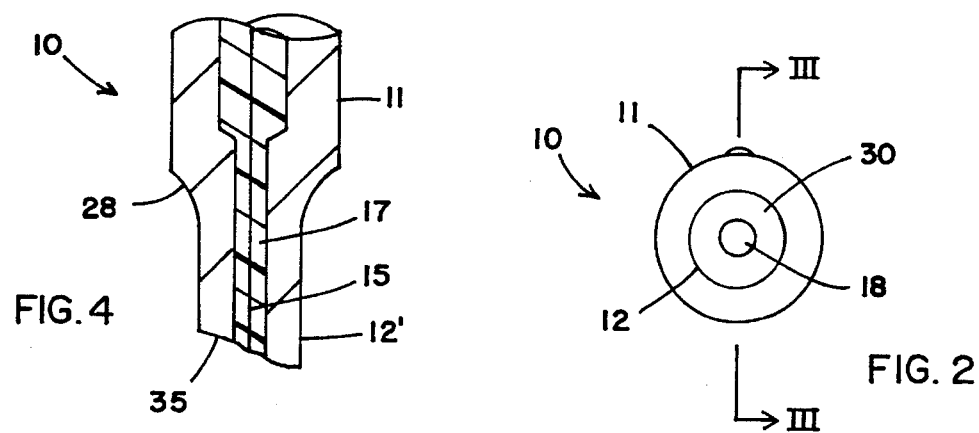
FIG. 1
FIG. 3
FIG. 4
FIG. 2

TOOL WITH BREAKAGE SENSOR AND METHOD

BACKGROUND OF THE INVENTION

The present invention concerns die punches, and more particularly concerns a die punch having means for indicating if the tip of the die punch has broken.

Punches are commonly used in dies to form holes in sheet metal during stamping operations. Periodically, the tip of a punch will break and all subsequent stamped pans will be defective until the broken punch is discovered and the stamping operation is stopped. If the problem is quickly discovered, only a few defective parts will be made. However, with automated die operations such as progressive sheet metal dies, pick-and-place dies, transfer dies, and similar die arrangements, the problem of a broken punch may not be discovered until several racks or bins of defective parts are made. Even if the defective pans can be reworked, reworks are labor intensive and inefficient, and part quality is difficult to control. As a result, the defective parts are often thrown away or otherwise disposed of. Quality control sensors can be used to assure that holes have been properly formed in stamped parts. However, sensors that are separate from the punch or die often give false readings since they depend upon the accuracy of part placement after stamping, and also since they depend upon the durability of the sensor which can be physically abused over time by moving stamped parts. Further, sensors require a separate station and require separate maintenance, both of which are undesirable and add expense. Still further, sensors located after the stamping operation are not an integral part of the stamping operation, and thus are "add on" features that take up space and can be maintenance problems.

U.S. Pat. No. 3,728,919 (to Scott) discloses a die punch including a pressurized passageway, and a pressure differential switch connected to the passageway to sense pressure change if the punch breaks. The pressure differential switch is operably connected to a press running a die incorporating the die punch to sound an alarm or otherwise stop the press if the die punch breaks. However, this arrangement requires that a compressed air hose and electrical wires be operably connected to the switch and to the press. Often there is often not a lot of room to position air hoses in dies. Further, air hoses are subject to being damaged, worn, or pinched such that they require maintenance. Still further, differential pressure switches are sensitive to contamination such as dirt, oil and other debris, which contamination is likely to be found around a die, either during operation of the die and/or during storage of the die. Additionally, modern press controls are usually electrically based, and thus a pneumatically based system is not preferred.

German Foreign Patent 329,753 (to Kischkat) discloses a die arrangement including a die having a punch holder, a punch attached to the punch holder, and a compression plate spaced from the punch holder for holding stock sheet material during the punching operation. A contact (h) on the punch engages a sensor (g) on the compression plate and establishes an electrical circuit with the punch during a "down" cycle of the press (FIG. 2). If the punch tip is broken, the punch does not make contact with the sensor, thus indicating a problem. However, the punch tip must break far enough up the shaft of the punch to prevent the punch contact (h) from engaging the sensor (g) before the sensor is no longer engaged on each press cycle. Further, sensor (g) is a separate part not incorporated into a punch per se, and thus it requires separate maintenance and adjustment. Still further, the disclosure in German '753 requires a particular die arrangement including a compression plate having room for the sensor. This arrangement is not compatible with many existing die structures and arrangements, and thus the disclosed arrangement is not retrofittable to many existing dies.

U.S. Pat. No. 3,124,026 (to Loeffel) discloses a spring biased misfeed detector including a pilot for progressive dies. A safety circuit in the tail section of the pilot is operably connected to a material feeder motor so that when the pilot engages misfeed stock material, the pilot is unseated and stops current flow to the feeder motor. Notably, the pilot disclosed in patent '026 can be used to sense the absence of a hole, but is not constructed to punch a hole, nor is it constructed to indicate if a punch tip has been broken.

Canadian Foreign Patent 666,057 (to Haywood) discloses a shear pin including a longitudinally extending passageway and a probe extending partially into the passageway and axially centered therein. If the shear pin breaks, the probe contacts the sidewalls of the shear pin to indicate the shear pin has broken. However, the structure of the shear pin and also the supporting structure are unsuitable for a die punch. Notably, the shear pin is intended to break when high loads are encountered. For example, the shear pin includes shear notches (75). Also, the proximity of the probe to the sidewall of the shear pin may lead to false readings.

Thus, a tool breakage sensor solving the aforementioned problems is desired.

SUMMARY OF THE INVENTION

In one aspect, a tool embodying the present invention includes a punch having a shank configured to operably engage a tool holder on a die, and a tip extending from the shank configured to punch a hole in sheet metal. The punch defines a passageway extending axially in the punch, and a conductor is located in the passageway. The conductor includes a first portion insulated from the punch and a second portion electrically connected to the tip at an extremity of the tip so that an electrical circuit is defined in the tip by the conductor. If the continuity of the circuit is interrupted, the tip of the tool has been broken. By operably connecting the circuit to press controls operating the die and by monitoring the continuity of the electrical circuit, the press controls can be configured to generate a signal indicating that the continuity is interrupted and the tip has been broken, whereby the press can be immediately stopped before a significant number of defective parts are made.

In another aspect, a tool embodying the present invention includes a punch having a shank configured to operably engage a tool holder on a die, and a tip extending from the shank configured to punch a hole in sheet metal. A marking medium is located in a passageway in the punch tip so that if the tip breaks, the marking medium creates a mark on a part to indicate that the punch tip has broken.

These and other features and advantages of the present invention will be further understood and appreciated by those skilled in the art by reference to the following specification, claims and appended drawings.

BRIEF DESCRIPTION OF THE DRAWINGS

FIG. 1 is a side view of a die punch embodying the present invention;

FIG. 2 is an end view of the die punch shown in FIG. 1;

FIG. 3 is a cross-sectional view of the die punch taken along the plane III—III in FIG. 2, the die punch being retained in a punch holder and schematically being shown attached to press controls;

FIG. 4 is a fragmentary cross-sectional side view of the punch shown in FIG. 3, the tip of the punch being shown as having been broken;

DETAILED DESCRIPTION OF PREFERRED EMBODIMENT

Figure 6:
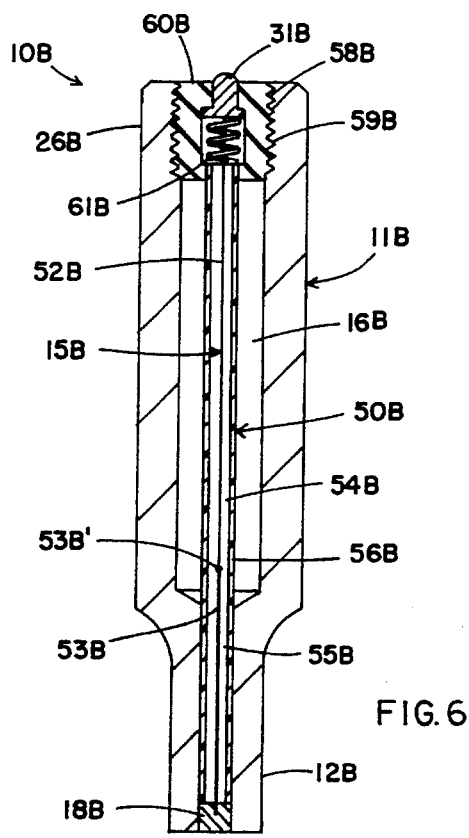
FIG. 6 is a cross-sectional side view of another embodiment of a die punch embodying the present invention.

A die punch 10 (FIGS. 1–3) embodying the present invention includes a shank 11 and a tip 12 extending axially from the shank 11. The shank 11 is configured to releasably engage a punch holder 13 on a die 14, and the tip 12 is configured to mateably engage a hole 14' in die half 14" to punch a hole of predetermined size and shape in sheet metal 14'''being formed on the die 14. A conductive wire 15 extends axially within a passageway 16 in punch 10, and is supported therein by an insulating material 17 such as epoxy material or the like. The wire 15 is connected to the tip 12 by a conductive bridge 18 such that a circuit 20 is defined from shank 11 through tip 12 and bridge 18 to wire 15. The circuit 20 is operably connected to press controls 19 so that, if punch tip 12 breaks and the electrical continuity of circuit 20 is interrupted, the press controls 19 create a signal to sound an alarm or otherwise stop the associated stamping operation or stamping press before a significant number of defective parts are made.

Shank 11 is a generally cylindrically-shaped member made of tool steel or the like. Punch holder 13 defines a hole for mateably receiving shank 11, and further includes a base 21 secured to die 14 for stably supporting punch 10. A teardrop-shaped depression 22 is formed in a side of shank 11 so that punch 10 can be releasably retained by a ball lock 23 on punch holder 13. Specifically, the ball lock 23 includes a hole 23' in punch holder 13, and a ball 24 located in hole 23' and biased into an extended retaining position by a spring 25. Ball 24 is held in hole 23' by flanges (not specifically shown), and can be moved against spring 25 to a release position by a probe-like tool through an auxiliary hole(not shown) in the punch holder 13. Releasable ball locks are generally known in the art, and exemplary ball locks are disclosed in the Dayton catalog appended to this application.

Shank 11 defines a trailing end 26 and a leading end 27. Tip 12 extends from leading end 27 and includes a cross-sectional shape configured to punch a hole of predetermined size and shape in sheet metal or other sheet material. Typical tip shapes include round, square, rectangular or other symmetrical geometric shapes, although it is noted that many different tip shapes can be made. Also, tips having different lengths can be made. Illustrative tip shapes and lengths common in the art are shown in the Dayton catalog appended hereto. A transition region 28 connects tip 12 to shank 11. Transition region 28 includes an outer tapered surface to improve the strength of tip 12 by reducing stress risers at the base of tip 12.

The passageway 16 extends from the trailing end 26 of shank 11 through shank 11 and tip 12 to the leading end 30 of tip 12. Notably, it is contemplated that passageway 16 need not extend completely from end-to-end of punch 10, although in the illustrated preferred embodiment passageway 16 does extend from end-to-end to facilitate machining. Optimally, passageway 16 has a small diameter in tip 12 so that the maximum amount-of material and strength is maintained in tip 12. Conductor 15 extends from end-to-end of punch 10 in passageway 16. A contact 31 is operably mounted in the trailing end 26 of shank 11 and is electrically connected to the trailing end 32 of conductor 15. Contact 31 is electrically insulated from shank 11. The bridge 18 is made of conductive material such as a ferrous material so that it electrically connects the leading end of conductor 15 to the leading end 30 of tip 12. Notably, bridge 18 must be located closer to end 30 than the typical plane of fracture 35 to maintain the functionality of the present invention. Bridge 18 can comprise any tough construction material such as solder, brazing, or the like. The insulating material 17 fills passageway 16 and insulates conductor 15 from engagement with shank 11 and tip 12. Preferably, the combination of insulating material 17 and wire 15 is sufficiently brittle such that when tip 12 breaks, the section of wire 15 at the plane of fracture 35 (FIG. 4) cannot bend into electrical contact with the remaining parts 12' of the tip (12). Epoxy is sufficiently brittle for this purpose, and can be used for insulating material 17. Also, the material of wire 15 is preferably somewhat brittle, such as a beryllium alloy wire, so that it will not "wrap over" into contact with tip 12' along the plane of fracture when tip 12 breaks. It is contemplated that a wire material having a hardness in the range of about 50–65 Rockwell C hardness will be satisfactorily brittle. A second spring biased contact 36 is attached to the side of shank 11 to improve the electrical contact between punch 10 and punch holder 13. This can be important since there may be grease or contaminants on the side of shank 11. However, it is contemplated that second contact 36 can be omitted in many applications.

In operation, the shank 11 of punch 10 is inserted into punch holder 13 and is releasably snap-locked into place by ball lock 23 in punch holder 13. Contacts 31 and 36 mateably engage corresponding contacts 37 and 38, respectively in punch holder 13. Contacts 37 and 38 are operably connected to press controls 19 by wires 39 and 40, respectively. Press controls 19 include a signal generating mechanism such as a relay or the like for stopping the press and/or the stamping operation and/or for sounding an alarm so that no significant number of defective parts are made when punch tip 12 breaks. The continuity of circuit 20 is continuously monitored by press controls 19 and, if the continuity is interrupted, i.e. the punch tip 12 has been broken, the press and/or stamping operation is automatically stopped or an alarm is sounded.

Figure 5:
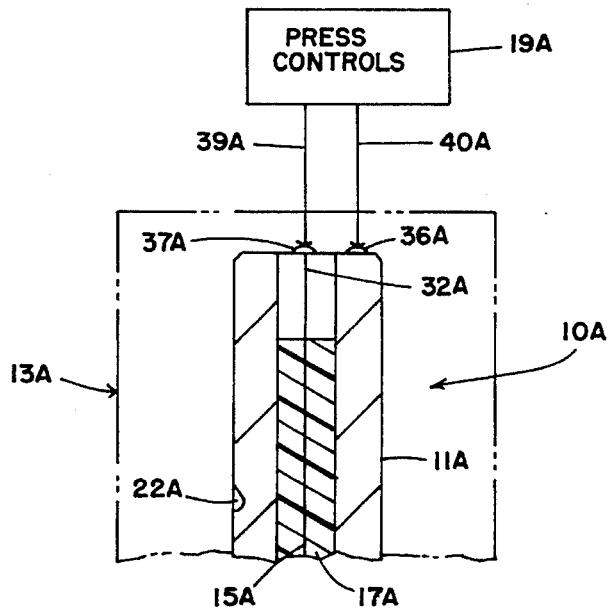
FIG. 5 is a fragmentary cross-sectional side view of an alternative embodiment of a die punch embodying the present invention.

A modified punch 10A (FIG. 5) includes a contact 36A located on the trailing end of punch 10A. Punch 10A is otherwise substantially identical to punch 10, and similar and identical features are identified with identical numbers but with the addition of the letter "A". Notably, it is contemplated that a number of different contact arrangements can be made without departing from the inventive concepts disclosed herein. It is still further contemplated that the arrangement disclosed herein can be incorporated into many tools for forming sheet materials or other materials where an elongated tool includes a tip subject to high stress and possible failure and where it is important that tip failure be immediately known.

A punch 10B (FIG. 6) includes a shank 11B having a passageway 16B, and a drop-in module 50B that can be inserted into passageway 16B to facilitate assembly of punch 10B. Punch 10B includes many similar and identical features to punch 10, and the similar or identical features are identified with the same numbers as were used on punch 10 to reduce redundant discussion, but with the addition of the letter "B".

Drop-in module 50B includes a conductive wire 15B comprising a trailing wire section 52B connected to a leading wire section 53B at connection 53B'. Leading wire section 53B is brittle to reduce the risk of it wrapping over into contact with shank 11 if tip 12B fractures. Trailing wire 52B is not brittle, but instead comprises a more conventional deformable electrical wire coated with insulating material. An insulating tubular housing 54B extends the length of conductive wire 15B. A brittle epoxy insulator material 55B covers leading wire section 53B along the wire's length. The tip of wire section 53B is electrically connected to shank tip 12B by a conductive bridge 18B, such as solder, brazing or the like.

A plastic tube 56B fills passageway 16B in punch shank trailing end 26B. Tube 56B provides support to module 50B to stabilize module 50B, and in particular wires 52B and 53B, in shank 11B. The trailing end of module 50B includes a thread 58B on retainer 60B for mateably engaging threads 59B in passageway 16B. Contact 31B is held by the non-conductive contact retainer 60B, and is biased axially by a coil spring 61B located around trailing wire section 52B. Spring 61B is compressed to extend contact 31B, and trailing wire section 52B is coiled slightly or bent next to retainer 60B to compensate for the movement of contact 31B.

Figure 7:
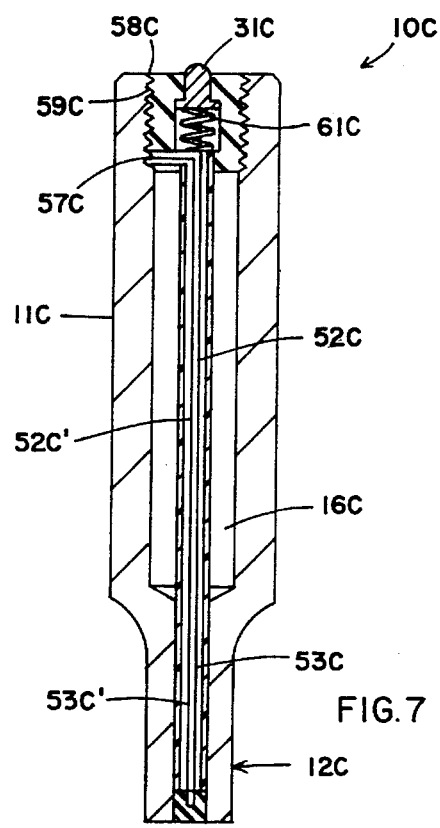
FIG. 7 is a cross-sectional view of yet another embodiment of a die punch embodying the present invention.

Punch 10C (FIG. 7) is substantially identical to punch 10B, and identical numbers are again used to identify identical features, but with the addition of the letter "C". However, punch 10C includes a double pair of trailing wire sections 52C and 52C' and also leading wire sections 53C and 53C' connected serially to form a conductive loop extending from shank trailing end 26C to tip 12C and back to shank trailing end 26C. The "return" wire section 52C' is electrically connected to shank 11C at location 57C adjacent threads 58C/59C. Thus, an electrical safety circuit is defined from contact 31C through wire sections 52C, 53C, 53C' and 52C' to shank 11C, which circuit is broken if tip 12C is broken. Specifically, both wire sections 53C and 53C' break if tip 12C is broken. Notably, punch 10C does not include a bridge at the end of tip 12C, however a plug can be used to prevent debris from entering the end of passageway 16C in tip 12C if desired.

Figure 8:
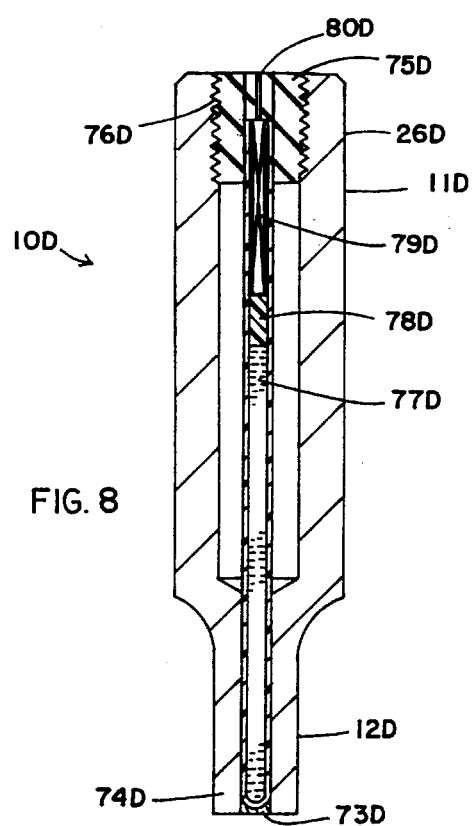
FIG. 8 is a cross-sectional view of still another embodiment of a die punch embodying the present invention.

A modified punch 70D (FIG. 8) includes a hollow shank 11D having a trailing end 26D configured to mateably securely engage a punch holder, not unlike shank 11. An axially extending passageway 72D is formed in shank 11D. A plug or slug of material 73D is located in the tip 12D of shank 11D and a threaded retainer 75D including thread 76D is located in the trailing end of shank 11D. Passageway 72D is filled with an ink or paint or other marking medium 77D, and a piston 78D is biased against paint 77D by a spring 79D so that ink 77D sprays out if the end 74D of tip 12D breaks. It is contemplated that a capsule can be used to contain the paint 77D within passageway 72D if desired, as long as the capsule is sufficiently brittle or thin to fracture when tip 12D breaks.

In this illustrated embodiment, a vent 80D is located in retainer 75D to prevent vacuum on the rear side of spring 79D from slowing the movement of piston 78D. Alternatively, compressed gas can be used to replace spring 79D, in which case the vent is eliminated. Still further, ink 77D could be replaced with a crayon-like material or by a fluorescent material so that when the material 77D sprays out, it marks at least the first stamped part formed after tip 74D breaks. The marked part would be easily noticed by an inspector or by an electric photosensitive eye. An advantage of punch 70D is that it can be used to replace existing punches without any modification to existing die arrangements and without any modification of the press controls. Further, it is mechanically operated, simple in operation, and easily installed.

In the foregoing description, it will be readily appreciated by those skilled in the art that modifications may be made to the invention without departing from the spirit of the concepts disclosed herein. Thus, such modifications are to be considered as covered in the following claims, as interpreted under patent law including the Doctrine of Equivalents.

The embodiments of the invention in which an exclusive property or privilege is claimed are defined as follows:

1. A tool comprising:
 a punch having a shank configured to operably engage a tool holder on a die and a tip extending from said shank configured to punch a hole in sheet material, said punch including a passageway extending axially in said shank and said tip; and
 a conductor located in said passageway, said conductor including a first portion insulated from said punch and a second portion electrically connected to said tip at an extremity of said tip so that an electrical circuit is defined in said tip by said conductor, whereby the continuity of the electrical circuit is interrupted if said tip of said tool is broken.

2. A tool as defined in claim 1 including a bridge electrically connecting said conductor to said tip.

3. A tool as defined in claim 2 wherein said bridge is proximate an end of said tip.

4. A tool as defined in claim 3 wherein said bridge comprises a conductive metal.

5. A tool as defined in claim 1 including an electrical contact operably connected to said conductor and located on a trailing end of said shank.

6. A tool as defined in claim 5 including a second electrical contact operably connected to said conductor and located on a side of said shank.

7. A tool as defined in claim 1, including an electrical contact located on a side of said shank and adapted to engage a corresponding electrical contact located on said tool holder.

8. A tool as defined in claim 1 wherein said shank defines a depression adapted to releasably engage a spring biased retainer member on the tool holder.

9. A tool as defined in claim 1 including an insulating material electrically insulating said first portion of said conductor from said punch.

10. A tool as defined in claim 9 wherein said insulating material comprises an epoxy material.

11. A tool as defined in claim 1 wherein said conductor comprises a wire.

12. A tool as defined in claim 11 including an insulating material electrically insulating said first portion of said conductor from said punch, said insulating material being relatively brittle so that said wire does not contact said shank when said tip breaks.

13. A tool as defined in claim 1 wherein said conductor comprises a brittle metal material.

14. A tool comprising:

a shank including a trailing end configured to operably engage a tool holder;

a tip extending from said shank and configured to form a hole in sheet material, said tip and said shank defining a passageway;

an electrical conductor located in said passageway in said tip; and a circuit including said electrical conductor, said electrical conductor including a first portion insulated from said shank and a second portion electrically connected to said tip at an extremity of said tip, said electrical conductor being configured to break and interrupt the continuity of said circuit when said tip breaks, whereby the continuity of the circuit can be used to determine when said tip breaks so that a press running a die incorporating said tool can be stopped before a significant number of defective parts are made.

15. A tool as defined in claim 14 including a conductive bridge located proximate an end of said tip, said bridge electrically connecting said conductor to said tip.

16. A tool as defined in claim 14 wherein said circuit includes an electrical contact attached to said shank, said contact being electrically connected to said conductor but insulated from said shank, said electrical circuit comprising a serial arrangement of said shank, said tip, said conductor, and said contact.

17. A tool as defined in claim 16 including a second contact attached to a side of said shank.

18. A tool as defined in claim 17 wherein said first electrical contact is defined on an end of said shank.

19. A tool as defined in claim 14 wherein said shank defines a depression adapted to releasably engage a spring biased retainer on the tool holder.

20. A tool as defined in claim 14 including insulating material electrically insulating at least a part of said conductor from said tip, at least one of said conductor and said insulating material comprising a brittle material that characteristically fractures when bent or broken rather than deforms.

21. An apparatus comprising:

a press including press controls;

a die configured for manufacturing parts in said press, said die including a punch holder; and a die punch comprising:

a shank configured to operably engage said punch holder on said die;

a tip extending from said shank, said tip being configured to punch a hole in sheet material being formed on said die, said punch including a passageway extending axially in said shank and said tip; and an electrical circuit defined in said tip including a conductor extending from said shank to said tip and located in said passageway, said conductor including a first portion insulated from said die punch and a second portion electrically connected to said tip at an extremity of said tip, said electrical conductor being operably connected to said press controls and being configured to interrupt the continuity of said circuit when said tip breaks, so that, when said tip breaks and said continuity of said electrical circuit is broken, said press controls generate a signal indicating that said tip has broken, whereby said press can be immediately stopped before a significant number of defective parts are made.

22. An apparatus as defined in claim 21 including a bridge located at an end of said tip for electrically connecting said conductor to said tip.

23. An apparatus as defined in claim 21 including an electrical contact connected to said conductor and located on a trailing end of said shank.

24. An apparatus as defined in claim 21 wherein said punch holder includes a spring biased retainer member, and said shank defines a depression adapted to releasably engage said spring biased retainer member.

25. An apparatus as defined in claim 21 including insulating material electrically insulating a part of said conductor from said tip.

26. An apparatus as defined in claim 25 wherein one of said conductor and said insulating material comprises a brittle material that characteristically fractures rather than deforms.

\* \* \* \* \*